(12) United States Patent
Mazzone

(10) Patent No.: US 9,825,476 B2
(45) Date of Patent: Nov. 21, 2017

(54) CRADLE FOR HANDHELD MACHINE-READABLE SYMBOL READER

(71) Applicant: Datalogic IP Tech, S.r.l., Bologna (IT)

(72) Inventor: Claudio Mazzone, Crespellano (IT)

(73) Assignee: DATALOGIC IP TECH, S.R.L., Bologna (IT)

( * ) Notice: Subject to any disclaimer, the term of this patent is extended or adjusted under 35 U.S.C. 154(b) by 279 days.

(21) Appl. No.: 14/496,326

(22) Filed: Sep. 25, 2014

(65) Prior Publication Data

US 2016/0094070 A1  Mar. 31, 2016

(51) Int. Cl.
| | |
|---|---|
| *H02J 7/00* | (2006.01) |
| *H02J 7/02* | (2016.01) |
| *H02J 50/10* | (2016.01) |

(52) U.S. Cl.
CPC ............ *H02J 7/0044* (2013.01); *H02J 7/025* (2013.01); *H02J 50/10* (2016.02)

(58) Field of Classification Search
CPC .................................................... H02J 7/0044
USPC ......................................................... 320/115
See application file for complete search history.

(56) References Cited

U.S. PATENT DOCUMENTS

| | | | |
|---|---|---|---|
| 5,198,650 A | 3/1993 | Wike, Jr. | |
| 7,316,592 B2* | 1/2008 | Chan | H01R 13/2421 |
| | | | 200/530 |
| 7,595,460 B1* | 9/2009 | Dodal | H01H 23/08 |
| | | | 200/339 |
| 7,863,856 B2 | 1/2011 | Sherman et al. | |
| 7,916,467 B2 | 3/2011 | Hotelling et al. | |
| 8,186,597 B1 | 5/2012 | Fletcher | |
| 8,519,671 B2 | 8/2013 | Bao et al. | |
| 8,610,403 B2 | 12/2013 | Chen | |
| 8,653,785 B2 | 2/2014 | Collopy et al. | |
| 8,662,399 B2* | 3/2014 | Vassura | G06K 7/10881 |
| | | | 235/375 |
| 2008/0102675 A1* | 5/2008 | Michaeli | H04M 1/04 |
| | | | 439/248 |
| 2009/0036119 A1* | 2/2009 | Smith | H04M 1/0258 |
| | | | 455/432.1 |
| 2010/0308116 A1 | 12/2010 | Sani et al. | |
| 2011/0016934 A1* | 1/2011 | Kowalczyk | E05B 47/0673 |
| | | | 70/280 |
| 2011/0098087 A1 | 4/2011 | Tseng | |
| 2011/0254501 A1 | 10/2011 | Izumi et al. | |
| 2012/0133328 A1* | 5/2012 | Chen | H02J 7/0044 |
| | | | 320/115 |

(Continued)

*Primary Examiner* — Samuel Berhanu
*Assistant Examiner* — Tessema Kebede
(74) *Attorney, Agent, or Firm* — Seed IP Law Group LLP

(57) ABSTRACT

Systems, methods, and articles to provide a charging cradle or base station that includes one or more movable electrical contacts. Generally, each of the movable contacts protrudes through an opening in a surface of the cradle only when a cordless electrical device is positioned on or within the cradle. When the cordless electrical device is not positioned on or within the cradle, the one or more movable contacts are retracted inside the body of the cradle such that the movable contacts cannot be bumped or hit by the reader during insertion of the reader into the cradle and during removal of the reader from cradle. Systems, methods, and articles to provide a charging cradle or base station with selectively removable electrical contacts are also disclosed.

9 Claims, 9 Drawing Sheets

(56) References Cited

U.S. PATENT DOCUMENTS

2012/0268238 A1\* 10/2012 Park .................... G07F 15/006
  340/5.8
2012/0319645 A1  12/2012 O'Donnell et al.
2012/0329532 A1\* 12/2012 Ko ....................... H04B 1/3888
  455/573

\* cited by examiner

CRADLE FOR HANDHELD MACHINE-READABLE SYMBOL READER

BACKGROUND

Technical Field

The present disclosure generally relates to electrical contacts that provide electrical coupling with cordless electrical devices.

Description of the Related Art

In mobile machine-readable symbol readers or other battery-operated devices, the battery may need to be charged often (e.g., daily). Conventionally, this task is performed by placing the reader on a charging cradle or base station in order to provide energy to the battery when the reader is placed on the charging cradle. The charging cradle may also function as a receiving system for data sent by the reader (e.g., wirelessly) relating to symbols read by the reader, and/or as a sending system that sends data or instructions to the reader (e.g., from a remote processor-based device).

The current utilized to supply the battery is sent to the reader through electrical contacts both on the cradle and on the reader. Normally, the contacts on the cradle are simple contacts that are spring loaded to extend into a cavity or recess of the cradle. When a user places a reader on the charging cradle, the spring-loaded contacts on the cradle are pressed into contact with the electrical contacts of the reader under the weight of the reader to provide an electrical connection. In some implementations, the reader and the cradle may have electrical contacts used for data transfer between the two devices in addition to the electrical contacts utilized to supply current to the battery of the reader.

A problem with the aforementioned approach is that the contacts of the charging cradle may wear out or break over time with repeated use. Additionally, the contacts may cause wear on the enclosure of the reader due to friction between the reader and the electrical contacts of the cradle that occurs during repeated use (e.g., multiple times per day for an extended period of time).

Over time, the force of the spring coupled to the contacts of the cradle may be reduced, which may lead to failure or poor contact between the contacts on the cradle and the contacts on the reader. Additionally, light weight readers may fail to apply sufficient pressure to the contacts of the cradle, causing unreliable electrical connections.

BRIEF SUMMARY

A cradle for an electrical device, the electrical device includes an external surface having an electrical contact thereon, the electrical contact electrically coupled to at least one electrical component of the electrical device, the cradle may be summarized as including: a body that includes: a device receiver portion that receives or supports at least a portion of the electrical device, the device receiver portion includes a contact surface positioned adjacent the external surface of the electrical device when the at least a portion of the electrical device is received or supported by the device receiver portion, the contact surface includes a contact aperture therein; an electrical contact; and a contact actuator physically coupled to the electrical contact, the contact actuator moves the electrical contact between a retracted position wherein the electrical contact of the cradle is positioned below the contact surface of the device receiver portion, and a protruded position wherein the electrical contact at least partially extends above the contact surface through the contact aperture.

The cradle may further include: an electrical device detector that detects the presence or absence of the electrical device proximate the device receiver portion; and a controller operatively coupled to the electrical device detector and the contact actuator, the controller receives via the electrical device detector an indication of the presence or absence of the electrical device proximate the device receiver portion, and causes the contact actuator to move the electrical contact into one of the refracted position and the protruded position dependent on the received indication. The electrical device detector may include at least one of a magnetic detector, an optical detector, an electrical detector, or a mechanical detector. The cradle may further include: a user interface operatively coupled to the controller, wherein the controller causes the user interface to provide a user notification dependent on the received indication. The user notification may include at least one of an audible notification or a visual notification. The contact surface of the device receiver portion may include a switch aperture, and the contact actuator may include a beam and a switch, the beam pivotable about a pivot point, a first end of the beam physically coupled to the electrical contact and a second end of the beam physically coupled to the switch, the switch at least partially protrudes through the switch aperture of the contact surface of the device receiver portion when the at least a portion of the electrical device is separated from the device receiver portion and, when the at least a portion of the electrical device is received or supported by the device receiver portion, the switch contacts at least a portion of the electrical device and causes the beam to pivot until the electrical contact is in the protruded position. The contact actuator may include an elastic member that biases the electrical contact in the retracted position when the at least a portion of the electrical device is separated from the device receiver portion. The elastic member may include a coil spring. The contact actuator may include at least one magnet that biases the electrical contact in at least one of the refracted position or the protruded position. The magnet may cause at least one of an attraction force or a repulsion force with a component of the electrical device when the at least a portion of the electrical device is received or supported by the device receiver portion. The contact actuator may include a bistable solenoid. The cradle may further include: a power source electrically coupleable to the electrical contact of the cradle. The body, the electrical contact and the contact actuator may be selectively removable from a base portion of the cradle which houses one or more electrical components. The electrical contact may be electrically coupleable to the one or more electrical components housed in the base portion of the cradle via at least one mechanical interlock. The cradle may be a cradle for a machine-readable symbol reader.

A cradle for an electrical device, the electrical device includes an external surface having an electrical contact thereon, the electrical contact electrically coupled to at least one electrical component of the electrical device, the cradle may be summarized as including: a contact connector comprising: a device receiver portion that receives or supports at least a portion of the electrical device, the device receiver portion includes a contact surface positioned adjacent the external surface of the electrical device when the at least a portion of the electrical device is received by the device receiver portion, the contact surface includes a contact aperture therein; an electrical contact; and a contact actuator physically coupled to the electrical contact, the contact actuator moves the electrical contact between a retracted position wherein the electrical contact of the cradle is positioned below the contact surface of the device receiver portion, and a protruded position wherein the electrical contact at least partially extends above the contact surface through the contact aperture; and a base portion that houses an electrical component electrically coupleable to a power source, wherein the electrical contact of the contact connector is coupleable to the electrical component of the base portion.

The contact connector may be selectively attachable to the base portion. The contact connector may include a first mechanical interlock, and the base portion may include a second mechanical interlock, the first and second mechanical interlocks selectively coupleable with each other to selectively couple the contact connector with the base portion of the cradle. The first mechanical interlock and the second mechanical interlock each may include a connector that selectively forms both electrical and mechanical connections. At least one of the contact connector or the base portion may include: an electrical device detector that detects the presence or absence of the electrical device proximate the device receiver portion; and a controller operatively coupled to the electrical device detector and the contact actuator, the controller receives via the electrical device detector an indication of the presence or absence of the electrical device proximate the device receiver portion, and causes the contact actuator to move the electrical contact into one of the refracted position and the protruded position dependent on the received indication.

A method of operating a recharging cradle for an electrical device, the electrical device includes an external surface having an electrical contact thereon, the electrical contact electrically coupled to at least one electrical component of the electrical device, the method may be summarized as including: providing a device receiver portion that receives or supports at least a portion of the electrical device, the device receiver portion includes a contact surface positioned adjacent the external surface of the electrical device when the at least a portion of the electrical device is received or supported by the device receiver portion, the contact surface includes a contact aperture therein; positioning an electrical contact in a retracted position wherein the electrical contact is positioned below the contact surface of the device receiver portion; and moving the electrical contact from the retracted position to a protruded position wherein the electrical contact at least partially extends above the contact surface through the contact aperture.

The method may further include: detecting the presence or absence of the electrical device proximate the device receiver portion; and moving the electrical contact into one of the refracted position and the protruded position dependent on detecting the presence or absence of the electrical device proximate the device receiver portion. Detecting the presence or absence of the electrical device may include at least one of magnetically detecting, optically detecting, electrically detecting, or mechanically detecting the presence or absence of the electrical device proximate the device receiver portion. The method may further include: providing a user notification dependent on detecting the presence or absence of the electrical device proximate the device receiver portion. Providing a user notification may include providing at least one of an audible notification or a visual notification. Positioning an electrical contact in a retracted position may include biasing the electrical contact in the retracted position via an elastic member. Biasing the electrical contact in the retracted position via an elastic member may include biasing the electrical contact in the retracted position via a coil spring. Positioning an electrical contact in a retracted position may include magnetically biasing the electrical contact in the retracted position. Moving the electrical contact from the retracted position to a protruded position may include moving the electrical contact using a magnetic force. The electrical contact may be physically coupled to an armature of a bistable solenoid, the armature movable between a first stable position and a second stable position, positioning an electrical contact in the retracted position may include operating the bistable solenoid to be in the first stable position, and moving the electrical contact from the retracted position to a protruded position may include operating the bistable solenoid to be in the second stable position. The method may further include: selectively removing the device receiver portion and the electrical contact from a base portion of the cradle which houses one or more electrical components; and selectively attaching the device receiver portion and the electrical contact from the base portion of the cradle. The method may further include: receiving or supporting by the device receiver portion the electrical device.

A method of operating a recharging cradle for an electrical device, the electrical device includes an external surface having an electrical contact thereon, the electrical contact electrically coupled to at least one electrical component of the electrical device, the method may be summarized as including: providing a contact connector comprising: a device receiver portion that receives or supports at least a portion of the electrical device, the device receiver portion includes a contact surface positioned adjacent the external surface of the electrical device when the at least a portion of the electrical device is received or supported by the device receiver portion, the contact surface includes a contact aperture therein; an electrical contact; and a contact actuator physically coupled to the electrical contact, the contact actuator moves the electrical contact between a retracted position wherein the electrical contact of the cradle is positioned below the contact surface of the device receiver portion, and a protruded position wherein the electrical contact at least partially extends above the contact surface through the contact aperture; providing a base portion that houses an electrical component electrically coupleable to a power source; and selectively coupling the contact connector to the base portion.

The contact connector may include a first mechanical interlock, the base portion may include a second mechanical interlock, and selectively coupling the contact connector to the base portion may include coupling the first and second mechanical interlocks to selectively couple the contact connector with the base portion of the cradle.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with machine-readable symbol readers, optical character recognition systems, other handheld or mobile electronic devices, server computers, and/or communications networks have not been shown or described in detail to avoid unnecessarily obscuring descriptions of the embodiments.

Unless the context requires otherwise, throughout the specification and claims that follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined or assembled in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the Disclosure provided herein are for convenience only and do not interpret the scope or meaning of the embodiments.

One or more implementations of the present disclosure provide a charging cradle or base station that includes one or more movable electrical contacts. Generally, in one or more implementations each of the movable contacts protrudes through an opening or recessed portion in a surface of a reader-receiving portion of the cradle only when a reader is supported by or received within the reader-receiving portion of the cradle. When the reader is not positioned on or within the reader-receiving portion of the cradle, the one or more movable contacts are retracted below a contact surface of the cradle such that the movable contacts cannot be bumped or hit by the reader during insertion of the reader into the reader-receiving portion and during removal of the reader from the reader-receiving portion. Thus, the wear on the electrical contacts is reduced, and the contacts are prevented from damaging the body of the reader.

Figure 1:
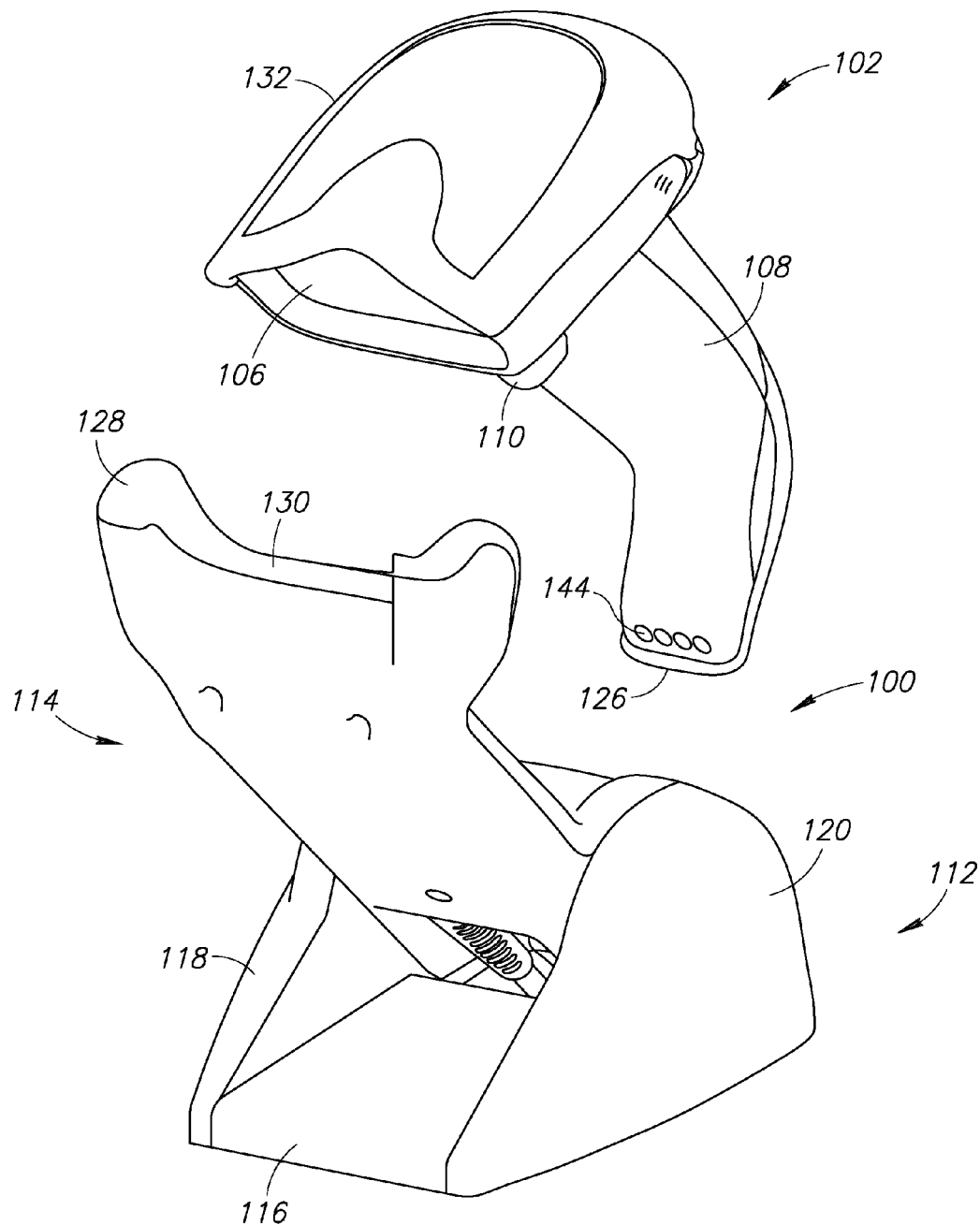
FIG. 1 is a front perspective view of a reading system that includes a charging cradle and a machine-readable symbol reader, according to at least one illustrated embodiment.
Figure 2:
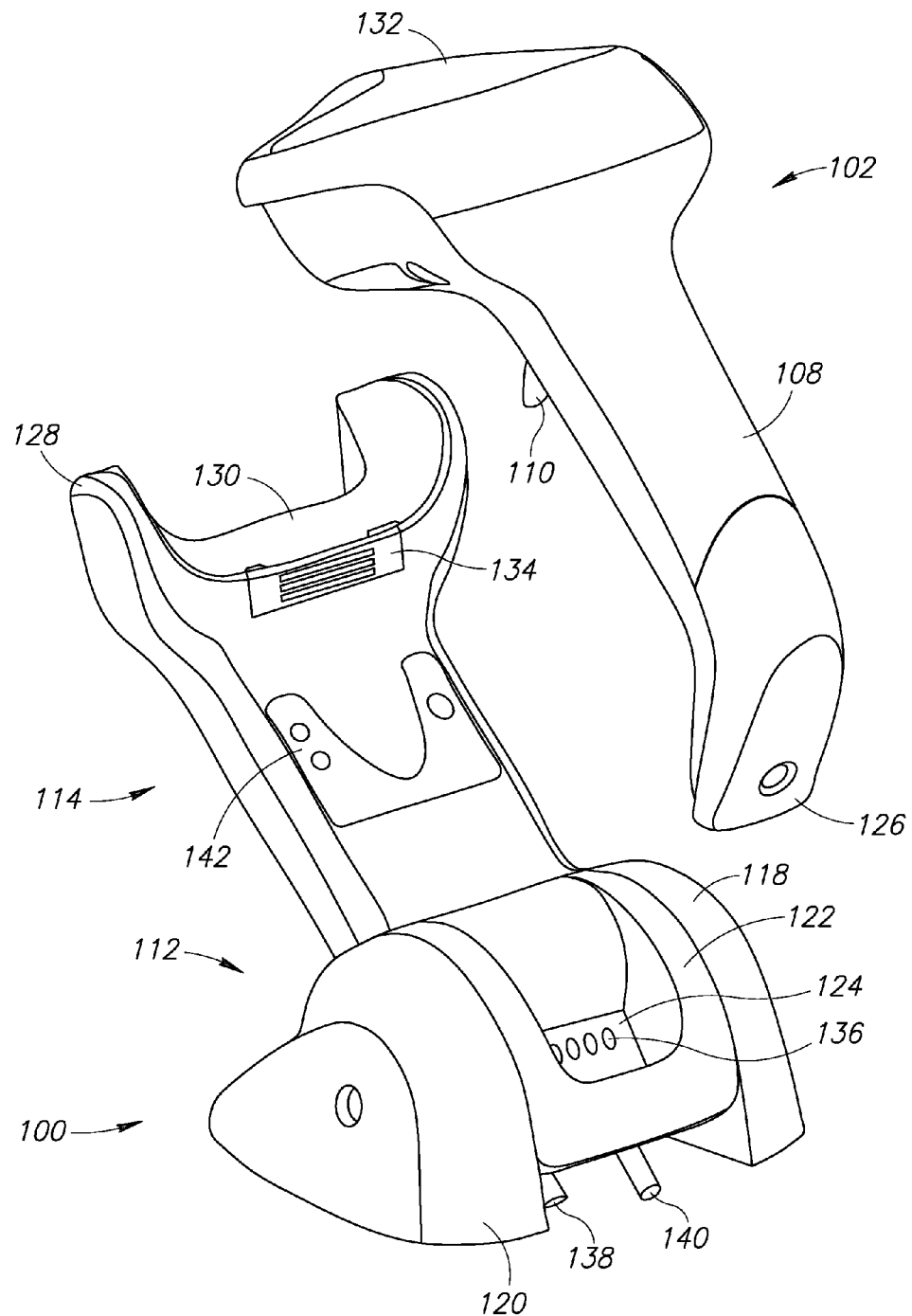
FIG. 2 is a rear perspective view of the reading system of FIG. 1, according to at least one illustrated embodiment.

FIGS. 1 and 2 show a base station or charging cradle 100 and a handheld processor-readable symbol reader 102. In the illustrated embodiment the reader 102 is generally gun-shaped and includes a reading head 104 including a light input/output window 106, and a holdable handle 108 which may be provided with a trigger-type activation push-button 110 and possible other control push-buttons (not shown).

The cradle 100 includes a base part or portion 112 and a support part or portion 114. The base part 112 has a bottom 116 (FIG. 1) and two opposite and spaced walls 118 and 120 disposed upright and substantially perpendicular to the bottom 116. Each of the walls 118 and 120 may be fixed to the bottom 116. In some embodiments, the walls 118 and 120 may be integrally formed with the bottom 116.

The base part 112 may be fixed to a horizontal or non-horizontal fixing surface (not shown), for example by way of screws passing through holes (not shown) of the bottom 116 or of one of the walls 118 and 120.

As illustrated, the support part 114 has an elongated form. At a first end 122 thereof, the support part 114 is disposed between the walls 118 and 120 of the base part 112. For example, on the side of each of the walls 118 and 120 the support part 114 may have a projection (not shown) of a shape that matches a corresponding seat (not shown) on an inward facing surface of the walls.

At the first end 122, the support part 114 also includes a first reader-receiving portion or recess 124 (FIG. 2) suitable to receive a first part of a reader, for example a lower portion 126 of the handle 108 of the reader 102.

At a second end 128 opposite the first end 122, the support part 114 includes a second reader-receiving portion or recess 130, suitable to receive a second part of the reader, for example, to receive in abutment a head 132 of the reader 102. The second recess 130 may also be provided with a retaining mechanism 134 (FIG. 2), for example one or more lugs or magnets suitable to engage in grooves or attract a ferromagnetic element of the reader 102. The first recess 124 and the second recess 130 form a seat for housing the reader 102.

The support part 114 may be coupled with the base part 112 in a fixed or variable orientation. In some implementations, the support part 114—and the reader 102 supported thereby—is substantially parallel to the support or fixing surface to which the bottom 116 of the base part 112 may be attached. In such a configuration, the cradle 100 is particularly compact, but, if the symbols to be read are optical codes, the light input/output window 106 of the reader is facing the fixing surface itself, so that the reader 102 is only usable for reading optical codes provided on substantially flat objects.

In some implementations, such as the one shown in FIGS. 1 and 2, the support part 114—and the reader 102 supported thereby—is tilted with respect to the support or fixing surface of the bottom 116 of the base part 112, in order to face, in the case of an optical code reader, the light input/output window 106 of the reader towards a reading position, in a presentation reader mode, not necessarily toward the support surface itself.

It is noted that the orientation of the support part 114 relative to the base part 112 may be chosen in the factory, or the choice may be left to the user. In the first case, a single cradle type may be provided in two alternative configurations, one suitable to act only as a recharge cradle and the other suitable to act as, besides as a recharge cradle, also as a support for the reader 102 in a presentation reader mode, with manufacturing and storage cost savings. In some implementations, the support part 114 may be selectively rotatable relative to the base part 112 so that the user can select whether the support part is substantially parallel to the fixing surface or whether the support part is tilted at an angle (e.g., 30°, 45°, 90°) with respect to the fixing surface.

The recharge function of the battery-type handheld reader 102 placed in the cradle 100 is ensured, in any orientation of the support part 114 with respect to the base part 112, in that the support part 114 has a power supply/recharge interface, in the form of movable electrical contacts 136 (FIG. 2) facing outward from the first reader-receiving portion or recess 124 that functions as a seat for the lower portion 126 of the handle 108 of the reader 102. The electrical contacts 136 may be positioned in the first recess 124 of the housing seat as shown, but they may additionally or alternatively be positioned in the second recess 130.

The support part 114 of the cradle 100 also includes a power supply input from an external source, such as a cable 138 (FIG. 2) connectable to a low voltage DC supply or to a remote device, for example a processor-based device. In such a manner, no electrical coupling is necessary between the base part 112 and the support part 114 of the cradle 100. The support part 114 may also include transformers and/or recharge circuits to adapt the power supply/recharge current or voltage to the batteries of the handheld reader 102. Alternatively, such recharge circuits could be housed in the reader 102 itself.

In some implementations, the cradle 100 may also include at least one wired or wireless communication interface that facilitates communication with the reader 102.

Communication may occur by way of the contacts 136 or by way of contacts that are additional to the contacts 136, but may also occur via infrared, via radio and in other modes, in which case the cradle 100 houses a receiving, transmitting or transceiving antenna, or receiving, transmitting or transceiver device, corresponding devices being provided in the reader 102.

The cradle 100 may in such a case act as a raw or processed data collector, such data being related to the coded information detected by the reader 102. The cradle 100 may in such a case provide for a memory for such information, processing and/or decoding electronics of the same and/or a communication interface with a remote processor-based device. Additionally, the communication with the remote processor may occur via cable, for example via a cable 140, or via infrared, via radio or, in other modes, corresponding devices may be provided for in the cradle 100.

By way of the communication interface(s), the cradle 100 may send configuration parameters to the reader 102, set via a user interface 142 (schematically indicated as a plurality of push-buttons and/or LEDs of FIG. 2) of the cradle 100 itself, or may forward configuration parameters of the reader set in a remote processor-based device.

The user interface 142 may also include one or more acoustic and/or luminous indicator devices, such as a buzzer, speaker, LED and/or a display, signaling that charging is underway, that acquisition is underway, that data transmission is underway, diagnostics and the like. The user interface 142 may also include one or more push buttons or other input devices for enabling or disabling such acoustic and/or luminous indicator devices, or for implementing other functionality.

The lower portion 126 of the handle 108 of the reader 102 is so shaped to be inserted in the first recess 124 of the support part 114 of the cradle 100, and the head 132 is so shaped to rest in the second recess 130 of the support part 114 of the cradle 100. Due to the curved shape of the support part 114 of the cradle 100 and/or to the gun shape of the reader 102, when the reader 102 is inserted in the housing seat of the cradle, its handle 108 is spaced from the support part 114 of the cradle and is therefore easy to grip.

The reader 102 also houses one or more rechargeable batteries, intended for supplying power to its components, and possibly recharging circuits therefor.

The reader 102 has electrical contacts 144 (FIG. 1) in proximity of its lower portion 126, in such a position as to come into contact with the electrical contacts 136 of the cradle 100 when the reader is placed therein.

In the case of an optical code reader (e.g., one-dimensional or barcode symbol reader, two dimensional or matrix symbol reader), the reading head 132 is provided with the light input and output window 106 and the reader 102 houses, appropriately arranged in one or both of the head 132 and the handle 108, a light beam emitting source, emitting and receiving optics, and a photodetector, as well as possible scanning mirrors of the light beam emitted by the light source and/or mirrors for deflecting such light beam towards the window 106 and/or for deflecting the light diffused by the optical code entering from the window 106 onto the photodetector.

The reader 102 may also house pre-processing electronics of the photodetector output signal, electronics for code acquisition and possibly for decoding the optical code, one or more memories, as well as a communication interface for transferring the electrical signal output by a photodetector or the acquired optical code or also the decoded optical code, as well as for receiving setting commands and possibly remote-activation commands. The communication may occur by means of an electrical interface, in some implementations comprising other contacts in proximity of the power supply/recharge contacts 136, or via radio, via infrared or other corded or cordless type communication interface.

The communication interface of the reader 102 may be coupled with the suitable communication interface of the cradle 100, or it may be directly coupled, optionally in wireless mode, with an interface of a remote processor-based device.

The reader 102 may, alternatively or additionally, read and/or write radio frequency identification (RFID) tags or transponders via radiofrequency. In such a case, the reader 102 includes a subsystem for generating an electromagnetic/electric field at an excitation frequency for an RFID transponder and a receiving, transmitting or transceiving antenna for receiving and/or transmitting a signal containing a code stored in an RFID tag. When implemented as an RFID reader, the reader 102 may also include processing and/or decoding electronics of such signal and possibly one or more memories, as well as a communication interface, analogous to the optical code reader.

In addition to the reader 102, the present disclosure may be implemented for use with any type of device that utilizes electrical contacts for recharging, communications, or the like. Such devices may include, but are not limited to, cordless phones, smart phones, power tools, portable radios, portable televisions, computers, or the like.

Figure 3A:
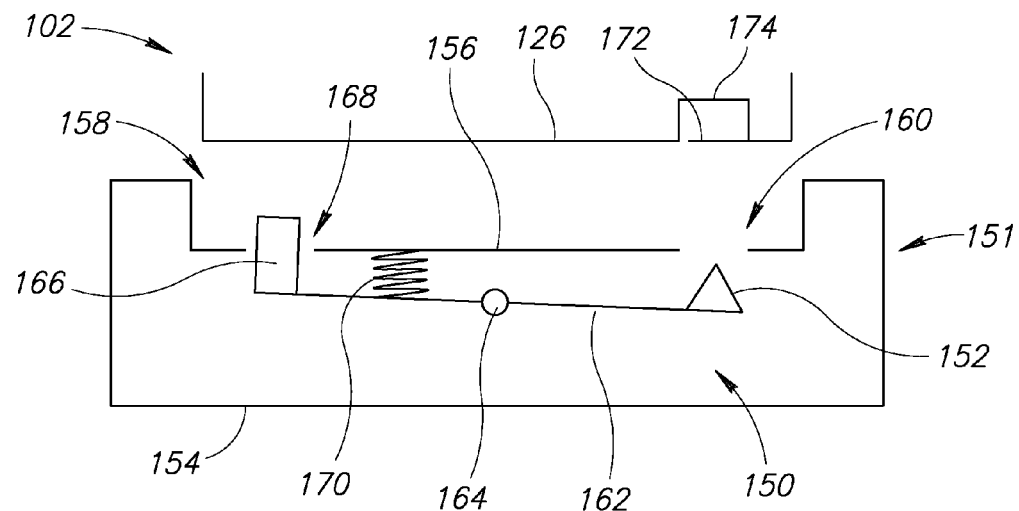
FIG. 3A is a partial side sectional view of an embodiment of a movable electrical contact system when an electrical contact thereof is in a retracted position, according to at least one illustrated embodiment.
Figure 3B:
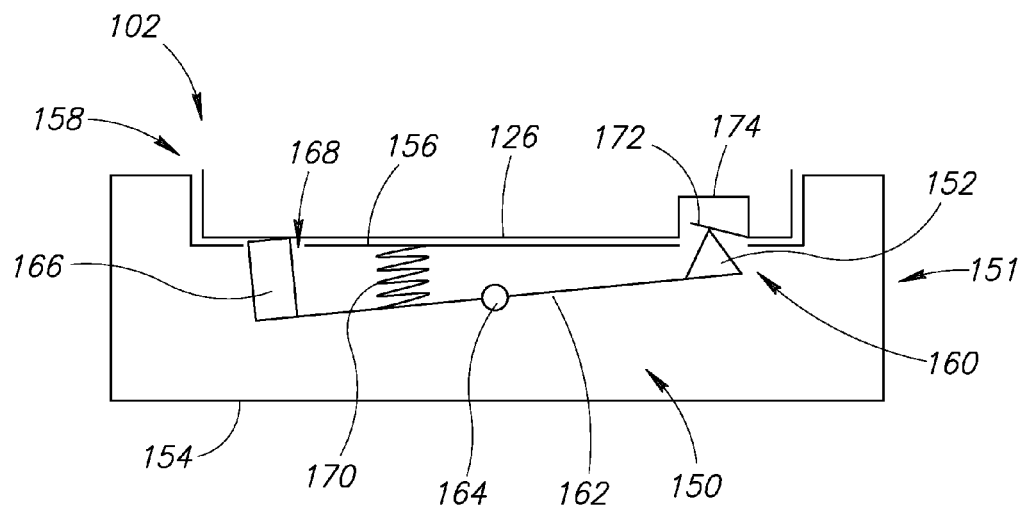
FIG. 3B is a partial side sectional view of the movable electrical contact system of FIG. 3A when the electrical contact thereof is in a protruded position, according to at least one illustrated embodiment.

FIGS. 3A and 3B show a simplified schematic diagram of a movable electrical contact system 150 for a base station or a charging cradle 151. The movable electrical contact system 150 may include an electrical contact 152 similar or identical to one or more of the electrical contacts 136 of the cradle 100 shown in FIGS. 1 and 2.

As shown, the electrical contact 152 is movable between a retracted position shown in FIG. 3A wherein the contact is positioned inside a body 154 of the cradle 151 below a top surface 156 of a reader-receiving portion 158, and a protruded position shown in FIG. 3B wherein the contact protrudes through a contact aperture 160 (or recess or cavity) in the top surface of the reader-receiving portion of the cradle. The electrical contact 152 is fixedly coupled to a first end of a rigid elongated beam or arm 162. The elongated arm 162 is pivotable about a pivot point 164, similar to operation of a lever. A second end of the arm 162 opposite the first end includes a switch 166 protruding through a switch aperture 168 in the surface 156 of the reader-receiving portion 158 of the cradle 151. A tension coil spring 170 (or other elastic member) is also coupled to the arm 162 in between the switch 166 and the pivot point 164.

When no force is applied to the switch 166, the spring 170 maintains the arm 162 in the position shown in FIG. 3A, wherein the electrical contact 152 is in the retracted position below the contact aperture 160 in the surface 156 of the reader-receiving portion 158. In the retracted position, the contact 152 cannot be damaged during insertion of the reader 102 (FIG. 1) into the cradle 151 or removal of the reader from the cradle.

When the lower portion 126 of the reader 102 is positioned in the reader-receiving portion 158 of the cradle 151 (e.g., to recharge the battery of the reader), the weight of the reader pushes the switch 166 downward against the bias of the spring 166. This in turn causes the arm 162 to rotate (counterclockwise in the view of FIGS. 3A and 3B) until the electrical contact 152 protrudes through the contact aperture 160 in the surface 156 of the reader-receiving portion 158 of the cradle 151. The electrical contact 152 may then physically contact an electrical contact 172 of the reader 102 positioned at a contact portion 174 in the lower portion 126 of the reader.

It should be appreciated that the shapes, sizes and positions of the movable electrical contact system 150 (e.g., spring 170, pivot point 164, arm 162, etc.) may be modified as needed to provide the functionality described herein. Additionally, the reaction force of the spring and the relative position between the center of gravity of the scanner and the lever parameters may be correctly dimensioned for a proper functionality.

Figure 4A:
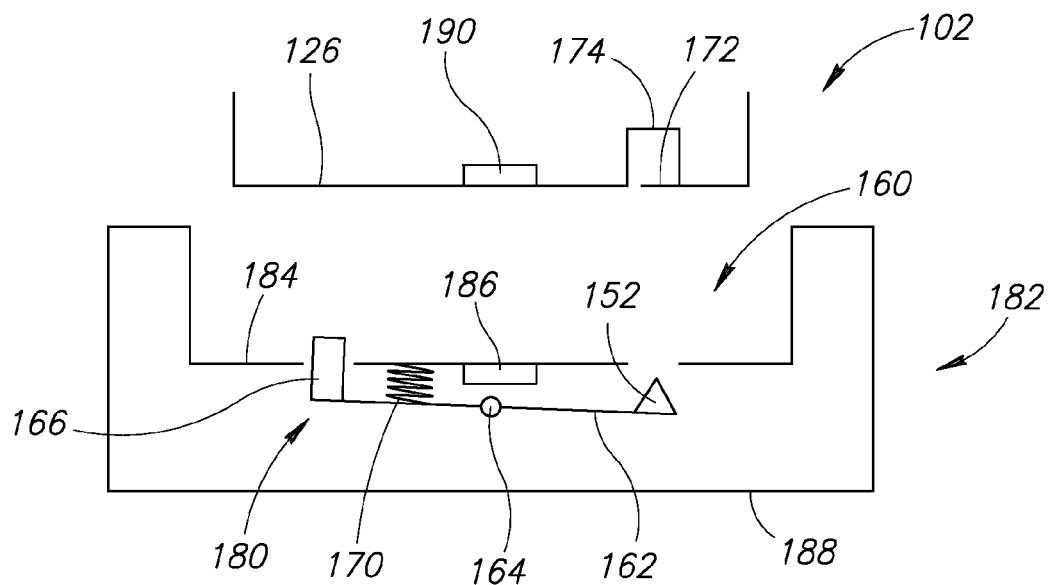
FIG. 4A is a partial side sectional view of an embodiment of a movable electrical contact system when an electrical contact thereof is in a retracted position, according to at least one illustrated embodiment.
Figure 4B:
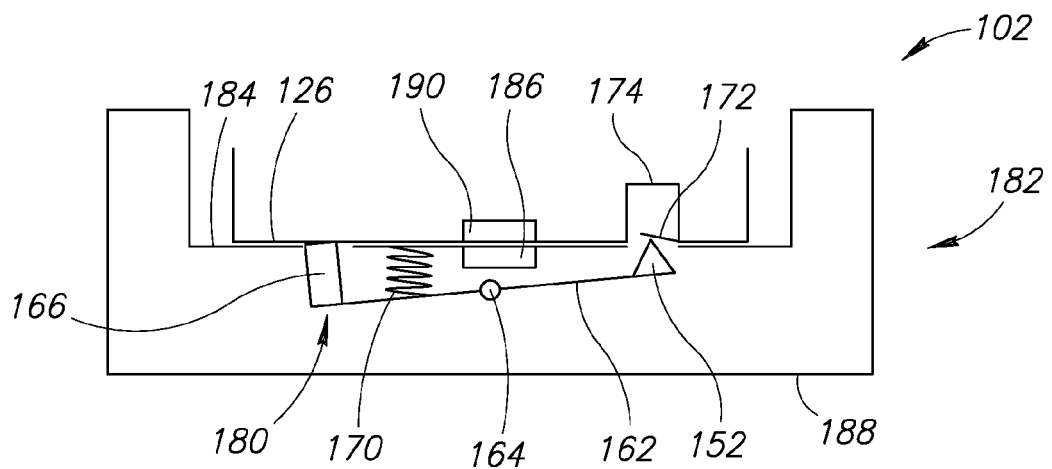
FIG. 4B is a partial side sectional view of the movable electrical contact system of FIG. 4A when the electrical contact thereof is in a protruded position, according to at least one illustrated embodiment.

FIGS. 4A and 4B show a simplified schematic diagram of another embodiment a movable electrical contact system 180 for a base station or a charging cradle 182. Many of the components of the electrical contact system 180 are similar or identical to the components of the electrical contact system 150 of FIGS. 3A and 3B. Discussion of similar or identical structures and elements is not repeated in the interest of brevity.

In the implementation illustrated in FIGS. 4A and 4B, a surface 184 that receives the lower portion 126 of the reader 102 may be mounted horizontally (as shown) or may be mounted vertically (e.g., on a wall). A magnet 186 (or a ferromagnetic element) is positioned within a body 188 of the cradle 182 adjacent to or near the surface 186. The lower portion 126 of the reader 102 also includes a magnet 190 (or a ferromagnetic element) that is attracted to the magnet 186 of the cradle 182. When a user positions the lower portion 126 of the reader 102 in close proximity to the surface 184, there is an attraction force between the magnets 186 and 190 that causes the reader 102 to move toward the surface and causes the switch 166 to be pressed toward the cradle 182, which causes the electrical contact 152 to move from the retracted position (FIG. 4A) to the protruded position (FIG. 4B). In this example, the attraction force between the magnets 186 and 190 is of a known value and may be greater than the weight of the reader 102 to retain the reader in the reader-receiving portion 158 of the cradle 182 even when the surface 184 of the cradle 182 is disposed vertically. Additionally, in some implementations wherein the cradle 182 is mounted such that the surface 184 is horizontal, the magnets 186 and 190 may provide an attraction force sufficient to cause the lower portion 126 of the reader 102 to move the switch 166 when the reader is placed in the reader-receiving portion 158 of the cradle. As can be appreciated, this feature may be beneficial in cases where the reader 102 has a low weight relative to the physical force required to actuate the switch 166.

Figure 5A:
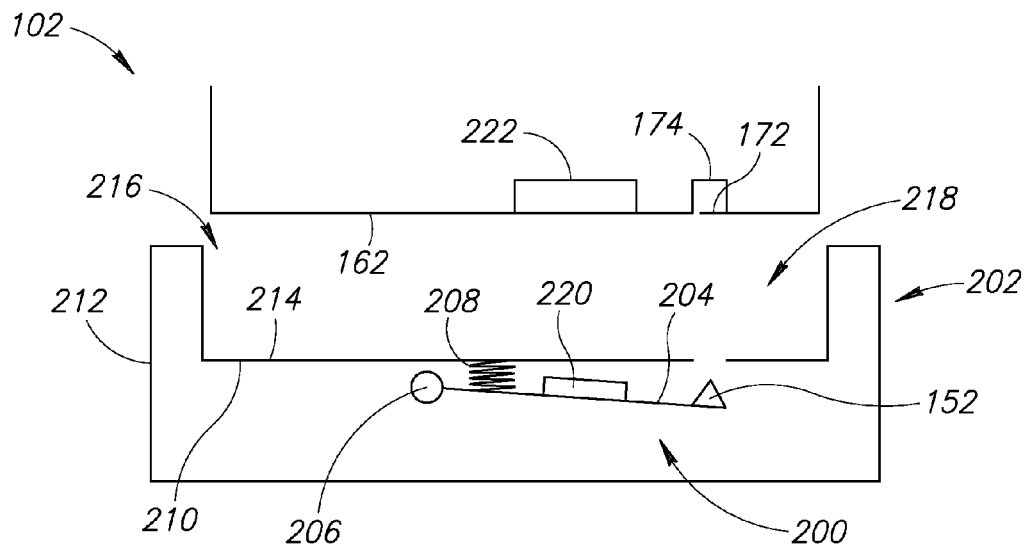
FIG. 5A is a partial side sectional view of an embodiment of a movable electrical contact system when an electrical contact thereof is in a retracted position, according to at least one illustrated embodiment.
Figure 5B:
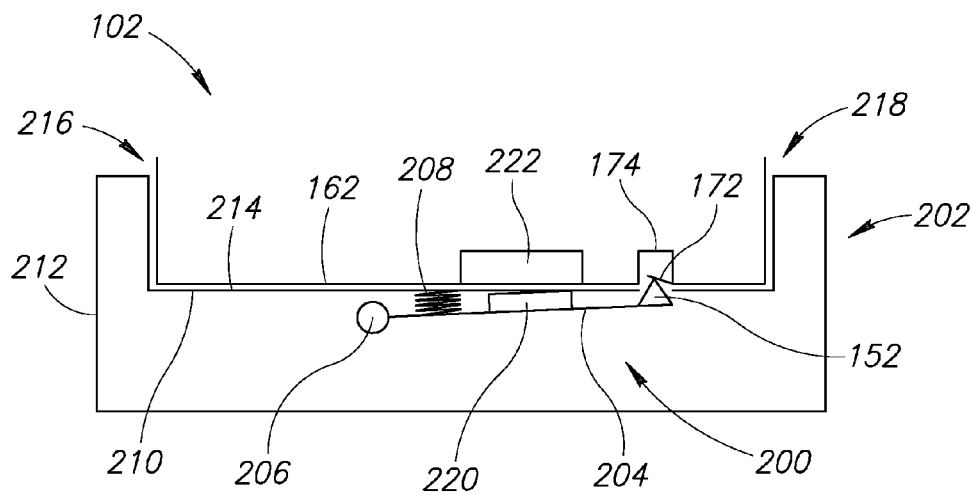
FIG. 5B is a partial side sectional view of the movable electrical contact system of FIG. 5A when the electrical contact thereof is in a protruded position, according to at least one illustrated embodiment.

FIGS. 5A and 5B show a simplified schematic diagram of another implementation of a movable electrical contact system 200 for a base station or a charging cradle 202. Many of the components of the electrical contact system 200 are similar or identical to the components of the electrical contact systems 150 and 180 of FIGS. 3A-3B and 4A-4B, respectively. Discussion of similar or identical structures and elements is not repeated in the interest of brevity.

In the implementation illustrated in FIGS. 5A and 5B, the electrical contact is positioned on an elongated arm 204 that is pivotable about a pivot point 206. The arm 204 is biased in the position shown in FIG. 5A by a compression spring 208 coupled between the arm and a surface 210 inside a body 212 of the cradle 202 opposite a top surface 214 of a reader-receiving portion 216 of the cradle. In the position shown in FIG. 5A, the electrical contact 152 is retracted below a contact aperture 218 (or recess) in the surface 214 of the reader-receiving portion 216 such that the contact cannot be damaged by the reader 102 upon insertion of the reader into the reader-receiving portion 216 of the cradle 202.

A magnet 220 (or ferromagnetic element) is physically coupled to the arm 204. Additionally, a magnet 222 (or a ferromagnetic element) is coupled to the lower portion 126 of the reader 102. When a user positions the lower portion 126 of the reader 102 in close proximity to the surface 214 (e.g., to recharge the battery of the reader), there is an attraction force between the magnets 220 and 222 that causes the arm 220 to move upward against the bias of the spring 208 and which causes the electrical contact 152 to move from the retracted position (FIG. 5A) to the protruded position (FIG. 5B). In the protruded position, the electrical contact 152 is in physical contact with the electrical contact 172 of the reader 102 so that voltage/current may be transferred between the cradle 202 and the reader (e.g., to recharge the battery of the reader).

It should be appreciated that the position of the magnets 220 and 222, the intensity and polarity of the magnetic fields of the magnets, and the relative position between the magnets may be modified as required to achieve the desired functionality.

Figure 6:
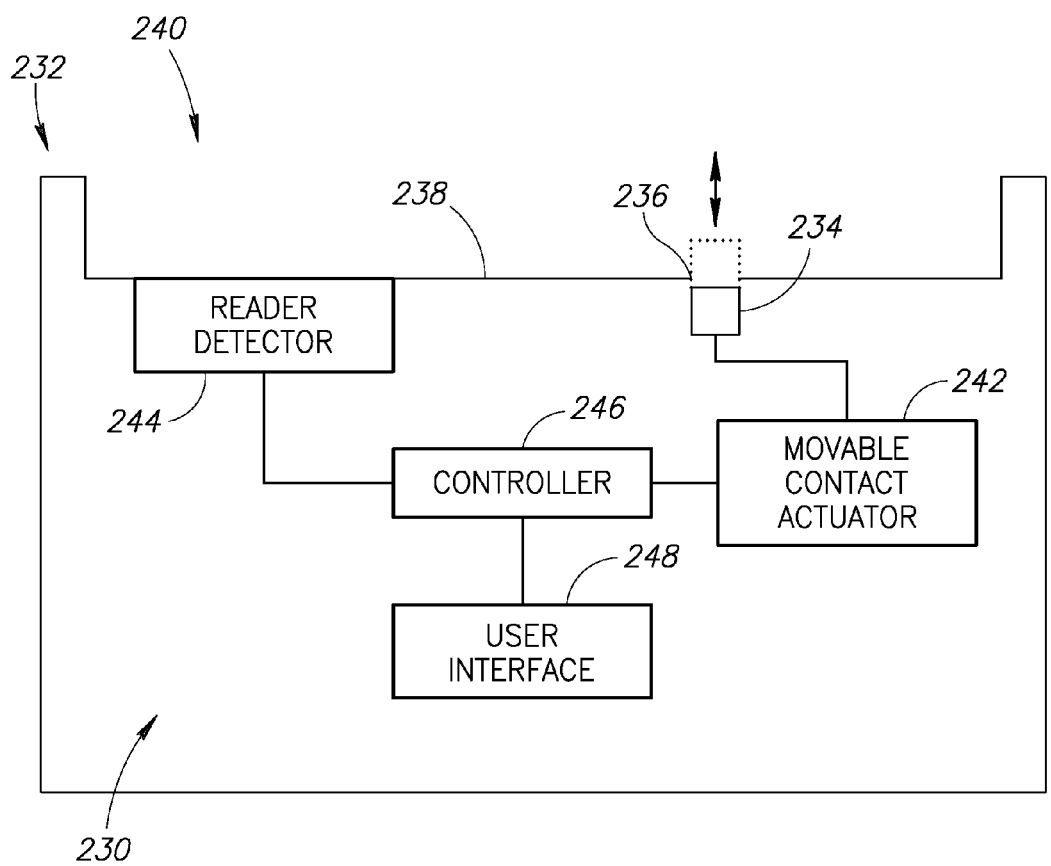
FIG. 6 is a schematic block diagram of a charging cradle that includes a movable electrical contact system, according to at least one illustrated embodiment.

FIG. 6 shows a block diagram of a movable electrical contact system 230 for a base station or charging cradle 232 according to another implementation of the present disclosure. In this implementation, a movable electrical contact 234 is disposed near an aperture 236 in a surface 238 of a reader-receiving portion 240 of the cradle 232 (e.g., the reader-receiving portion 124 of the cradle 100 of FIG. 2). The movable electrical contact 234 is operatively coupled to a movable contact actuator 242 that operates to move the electrical contact between a retracted position (FIG. 6) and a protruded position (shown in dashed lines).

The cradle 232 may include a reader detector 244 that detects the presence of a reader in the reader-receiving portion 240 of the cradle 232. The reader detector 244 may utilize one or more of magnetic, optical, electrical, or mechanical techniques to measure the presence of the reader in the reader-receiving portion 240. For example, the reader detector 244 may include one or more of a proximity sensor, a touch sensor, an infrared (IR) sensor, a load cell, a reed switch, a capacitive sensor, or other types of detectors that detect when the reader is present in the reader-receiving portion 240 of the cradle 232 or absent therefrom.

The cradle 232 may also include a processor or controller 246 operatively coupled to the reader detector 244 and to the movable contact actuator 242. The reader detector 244 may output a detection signal to the controller 246, which in turn instructs the movable contact actuator 242 to move the electrical contact 234 into one of the retracted position and the protruded position, dependent on whether the reader detector 244 detects the presence of the reader in the reader-receiving portion 240 of the cradle 232. The controller 246 may include a simple electronic circuit, and/or may include one or more advanced components, such as one or more microprocessors, digital signal processors, programmable gate arrays (e.g., FPGAs), application-specific integrated circuits (ASICs), or the like.

The controller 246 may be operatively coupled to a user interface 248, which may include one or more audio or visual output devices (e.g., speaker, buzzer, LED, display, etc.). In some implementations, the controller 246 may provide audio or visual feedback to a user via the user interface 248 indicating the detected presence or absence of the reader. Thus, a user of the reader is able to easily know whether the reader is properly inserted into the cradle 232 and that the battery of the reader is recharging.

Figure 7A:
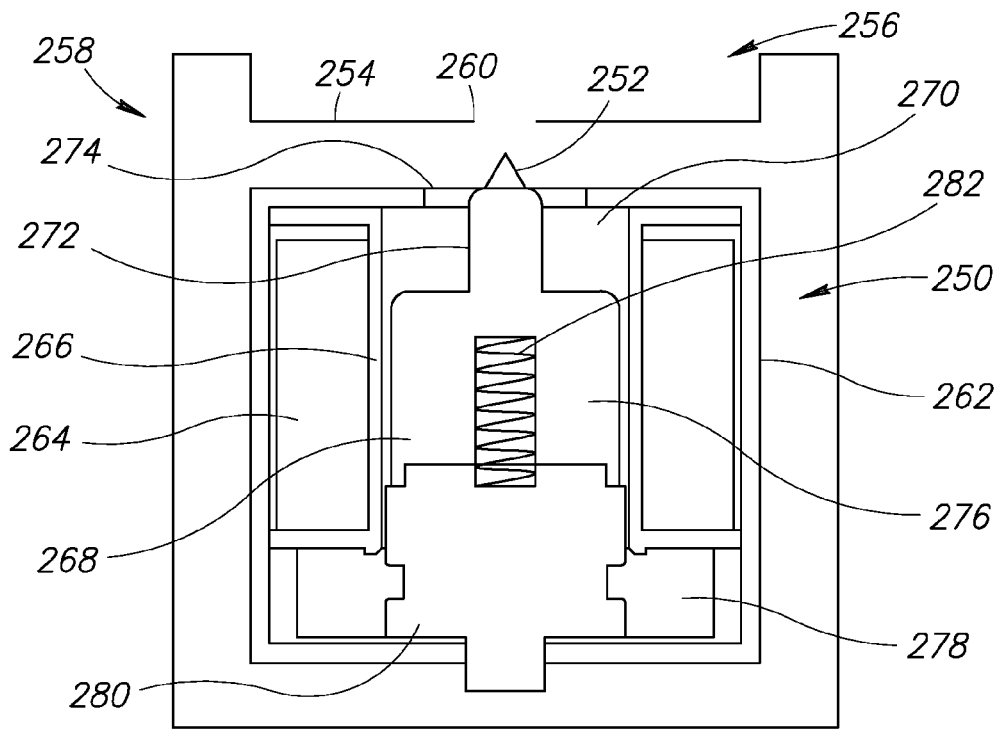
FIG. 7A is a sectional view of a movable contact actuator in the form of a bistable solenoid when a movable electrical contact is in a retracted position, according to at least one illustrated embodiment.
Figure 7B:
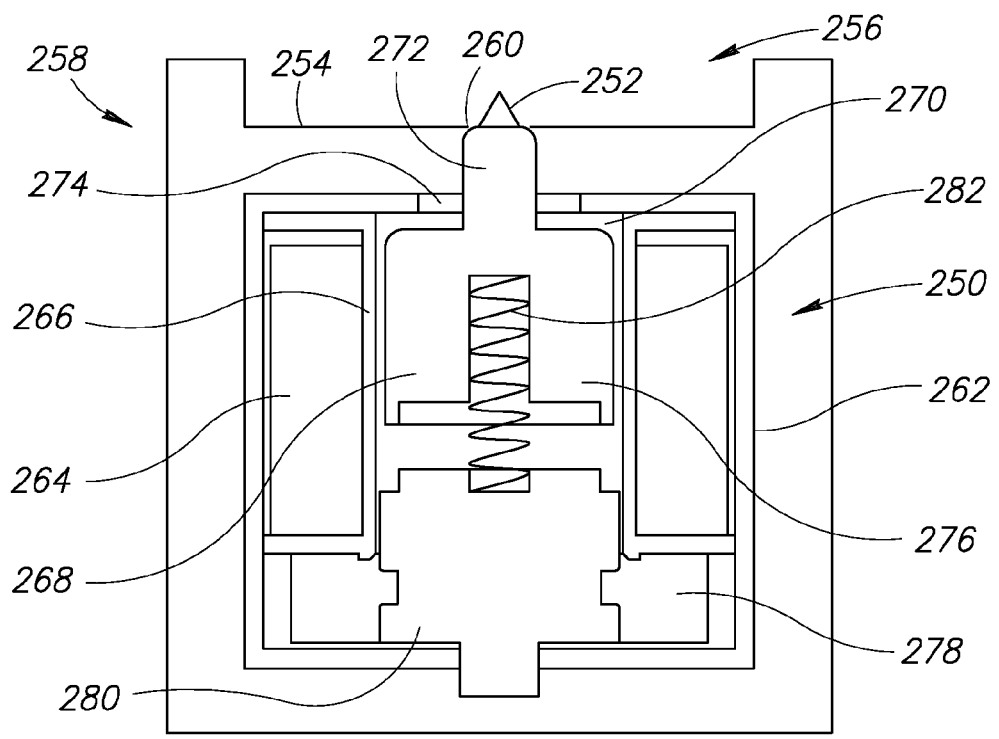
FIG. 7B is a sectional view of the movable contact actuator of FIG. 7A when the movable electrical contact is in a protruded position, according to at least one illustrated embodiment.

FIGS. 7A and 7B show one example of the movable contact actuator 242 of FIG. 6, implemented as a bistable or latching solenoid 250. The bistable solenoid 250 operates to move an electrical contact 252 relative to a surface 254 of a reader-receiving portion 256 of a cradle 258 between a retracted position (FIG. 7A) wherein the electrical contact is positioned below a contact opening 260 and a protruded position (FIG. 7B) wherein the electrical contact extends at least partially through the contact opening.

The bistable solenoid 250 includes a housing 262 containing a coil 264 wrapped around a bobbin or core 266. An armature or plunger 268 is received within a cylindrical bore 270 of the bobbin 266 so as to be movable along a cylindrical axis of the bobbin. The armature 268 includes a first portion 272 having a cross-sectional area that permits the first portion to pass through an opening 274 in the housing 262. The armature 268 also includes a second portion 276 having a cross-sectional area that does not permit the second portion to pass through the opening 274 in the housing 262. Thus, the shapes of the first and second portions 272 and 276 of the armature 268 and the shape of the opening 274 in the housing 262 function to limit the linear movement of the armature (and the electrical contact 252) along the longitudinal axis of the bobbin 266.

The housing 262 also includes a permanent magnet 278 that surrounds a stationary pole 280. A coil spring 282 is coupled between the stationary pole 280 and the armature 268 to bias the armature away from the stationary pole in a de-latched position shown in FIG. 7B.

As current is controlled to flow in one direction energizing the coil 264 in the solenoid 250, the coil field adds to the pull of the permanent magnet 278 on the armature 268. The armature 268 is attracted to the stationary pole 280 within the housing 262. Once the armature 268 has moved to be fully in contact with the stationary pole 280 (FIG. 7A), the armature remains in this latched position without any further power input. The armature 268 is held in this position by the permanent magnet 278. To release the armature 268 from the hold or latched position, the attraction of the permanent magnet 278 is canceled by sending a current through the coil 264 in the opposite direction, thereby allowing the coil spring 282 to move the armature 268 into the de-latched position shown in FIG. 7B.

Bistable solenoids, such as the one illustrated in FIGS. 7A and 7B may be advantageous because bistable solenoids may be maintained in two positions (latched and de-latched) without requiring continuous power. However, other types of solenoids or, more generally, other types of movable contact actuators may be utilized to provide the functionality provided by the present disclosure.

Figure 8:
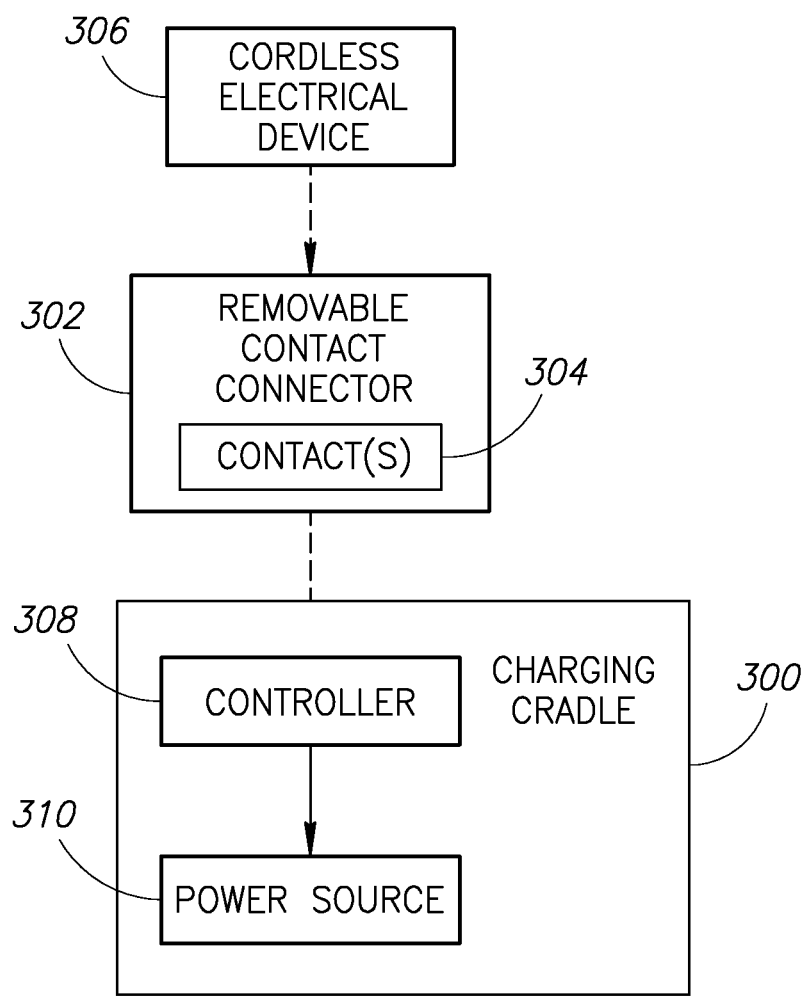
FIG. 8 is a schematic block diagram of a charging cradle and a removable contact connector, according to at least one illustrated embodiment.

FIG. 8 shows a block diagram of a charging cradle 300 that receives a removable contact connector 302. The removable contact connector 302 may be a mechanical part that is selectively attachable to the charging cradle 300 via a mechanical interlock (e.g., one or more screws, clasps, connectors, etc.).

The removable contact connector 302 includes one or more electrical contacts 304. When the removable contact connector 302 is physically attached to the charging cradle 300, the one or more electrical contacts 304 are electrically coupled to electronics of the charging cradle 300, such as a controller, power source, etc. The removable contact connector 302 may be shaped to receive a portion of a cordless electrical device 306 (e.g., a machine-readable symbol reader) having electrical contacts that physically contact the electrical contacts 304 of the removable contact connector 302 when the cordless electrical device is placed on the charging cradle 300. Thus, the removable contact connector 302 provides an electrical connection between electrical contacts of the cordless electrical device and electronics of the charging cradle 300, such as a controller 308 or a power source 310.

The contacts 304 of the removable contact connector 302 may be similar or identical to any of the movable electrical contacts described in the present disclosure. Additionally, the contacts 304 may be conventional electrical contacts. Advantageously, the removable contact connector 302 may be replaceable should one or more of its contacts 304 become damaged without requiring replacement or repair of the overall charging cradle 300. Since the removable contact connector 302 may be manufactured relatively inexpensively compared to the overall charging cradle 300, allowing replacement of only the removable contact connector 302 upon failure of one or more of the contacts 304 reduces expense and/or downtime due to such failure.

Figure 9A:
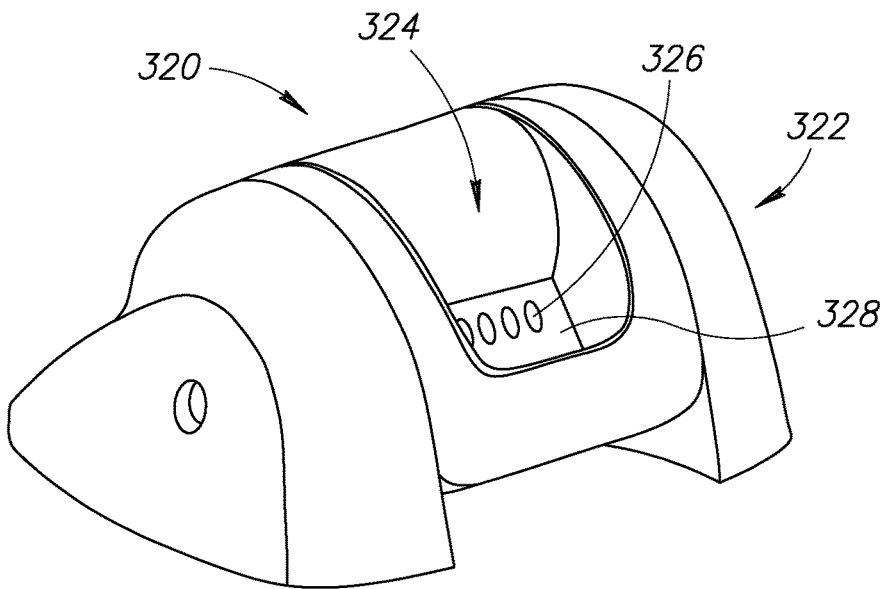
FIG. 9A is a rear perspective view of charging cradle and a removable contact connector when selectively coupled together, according to at least one illustrated embodiment.
Figure 9B:
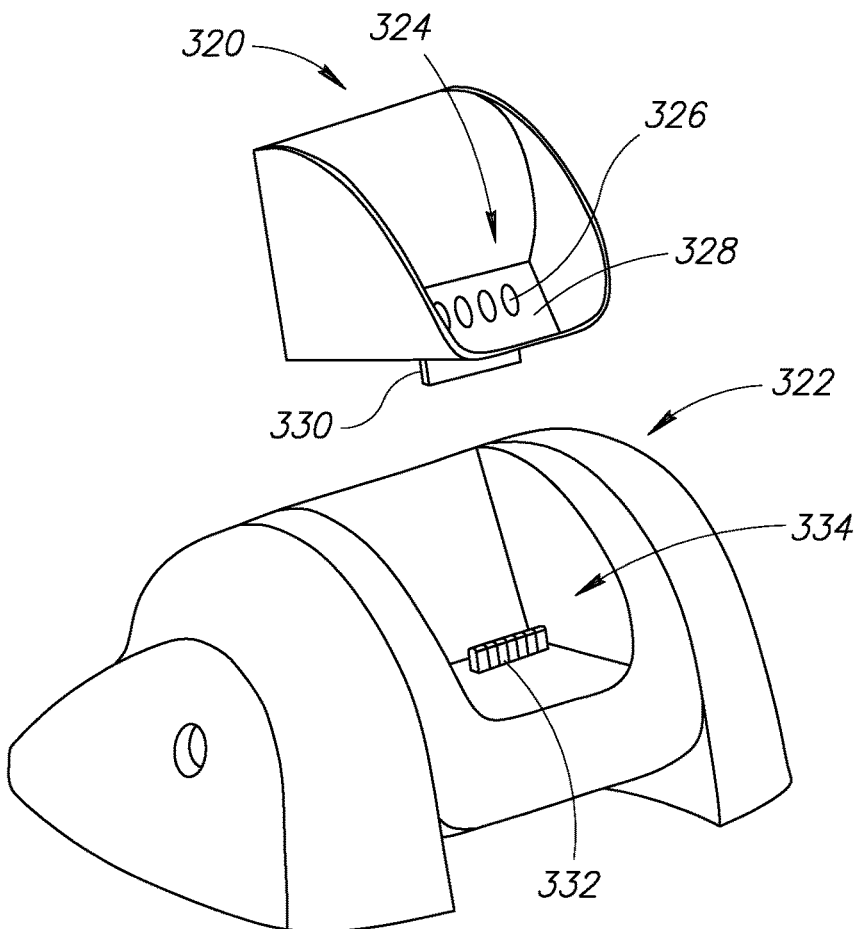
FIG. 9B is a rear perspective view of the charging cradle and the removable contact connector of FIG. 9A when selectively separated from each other, according to at least one illustrated embodiment.

FIGS. 9A and 9B show an example implementation of a removable contact connector 320 and a corresponding charging cradle 322. The removable contact connector 320 includes an interior reader-receiving portion 324 and a plurality of electrical contacts 326 positioned on a surface 328 of the reader-receiving portion. The contacts 326 may be similar or identical to any of the movable electrical contacts described in the present disclosure, or may be conventional electrical contacts.

The removable contact connector 320 also includes a mechanical interlock 330 that is selectively attachable to a corresponding mechanical interlock 332 of the charging cradle 322. In the illustrated example, the mechanical interlocks 330 and 332 are in the form of plug/socket connectors that provide selective electrical and mechanical coupling between the contacts 326 of the removable contact connector 320 and circuitry within the cradle 322. Other types of mechanical interlocks may be used.

The cradle 322 includes a contact connector receiving portion 334 (FIG. 9B) shaped and sized to selectively receive the removable contact connector 320 therein. In use, the removable contact connector 320 may be positioned within the contact connector receiving portion 334 of the cradle 322 so that the mechanical interlocks 330 and 332 are coupled together. The cradle 322 may then be utilized by a user to repeatedly recharge the batteries of a cordless electrical device, such as the reader 102 shown in FIGS. 1 and 2. Should one or more of the electrical contacts 326 of the removable contact connector 320 become damaged or otherwise nonfunctional, the user may simply remove the removable contact connector 320 and replace it with a functional removable contact connector. Thus, the removable contact connector 320 eliminates the need to replace or repair an entire charging cradle due to failure of one or more electrical contacts.

Battery Charging

Another potential issue with charging cradles is that in many applications the cradle is connected to a current-limited interface, such as a Universal Serial Bus (USB®) interface. Generally, a USB® interface has a limited amount of current to supply (e.g., 500 mA). If the current available via a USB® interface is used: to operate the electronics in the charging cradle; to operate the electronics in the reader; and to charge the battery and or ultra-capacitor(s) of the reader, the result is that the current available to be supplied to the battery is low, resulting in an extended time required to recharge the battery of the reader.

One way to overcome this problem is as follows: When the charging cradle is used with a current-limited interface (e.g., USB®), the cradle remains connected to a host system (e.g., a computer) via this interface and is allowed to draw a maximum current (e.g., 500 mA) even when the battery of the reader is not being recharged or when the reader is not seated in the cradle at all.

In known systems, the current limit significantly increases the time required to charge the battery of the reader. In fact, when the reader is on the cradle, only a portion of the available current is used to recharge the battery because part of the current has to be used to operate the electronics in the reader and the electronics in the cradle. Normally, only about one third of the available current is used for charging the battery. In contrast, when the reader is in use (or otherwise out of the cradle) and not being charged by the cradle, not all of the available current by the USB® supply is needed to operate the cradle. When the cradle is not used to recharge the reader's battery, the operating current needed for the basic function of the cradle is quite small. In this case, much of available energy from the USB® interface is not used. Because in many application the reader is not on the cradle for many hours (or it is often forgotten by the operator), the level of this unused available energy is significant.

In some implementations, the charging cradle may be provided with one or more secondary batteries. The characteristics of this additional battery system (chemistry, number of cells, voltage and current) may be chosen to optimize the complete system. In some implementations, it is not necessary for this battery to be the same as the battery used in the reader. For example, the capacity of the one or more secondary batteries may be higher than the capacity of the battery in the reader. The cradle construction may be such that the one or more secondary batteries may be easily replaced by the user if they are not fully charged or if the lives of the one or more secondary batteries have expired. In addition to a secondary battery, other power storage devices such as ultra-capacitor cells may be used in similar fashion to secondary battery cells.

When the reader is not on the cradle, the cradle continuously charges the secondary battery. In this way, the cradle uses most or all of the available current from the USB® interface at any time. In this case, the current available to charge the secondary battery is more than the current available for recharging the battery of the reader because only the cradle electronics have to be supplied with power. This solution gives the possibility to store additional power to be used later when the reader will be put on the cradle for recharging.

When the reader is positioned on the cradle, the current to recharge its battery is drawn from the secondary battery of the cradle until the power available from it is consumed. Only when the secondary battery has been discharged to a predefined level is the battery charged using power from the USB® interface. Full discharge of the secondary battery may not happen in systems where the reader is out of the cradle for an extended time.

Further, if the reader is positioned on the cradle for an extended period of time, the first battery to be recharged is the battery in the reader and, when this process is completed, then most or all of the available USB® current is used to recharge the secondary battery of the cradle.

Control electronics may be in charge of managing the current to be delivered to the battery of the reader, to optimize the charging time of the secondary battery, and to detect and manage the possible conditions and protections for safety issues. Different strategies may also be programmed in the charging system according to the operating conditions, the operator's needs, and the average time the reader is out of the cradle. This system gives the possibility to exploit all the USB® current available at any time and reduces the total time required to recharge the battery of the reader. An additional advantage is that the secondary battery of the cradle does not need to be a battery pack shaped according to the mechanical constraint of the reader (e.g., batteries for a reader are typically more expensive than standard batteries) and it may be easier and cheaper for the user to replace and keep fully charged this secondary battery. For this purpose, control signals may inform the user about the secondary battery level. If the secondary battery (or batteries) is commercially available, then the user may also use standard chargers and standard batteries as spare parts, while this may not be possible for the reader. A similar solution may be applied also wherein the charging cradle may be operative to charge a secondary battery similar to the one used in the reader.

In some applications, the charging cradle may have a secondary charging location for a spare battery (e.g. a spare battery for the reader). This secondary battery may be used to replace the battery in the reader when it is completely discharged. The spare battery may always be under charge when the reader is not on the cradle. In this case, the user may choose to replace the battery of the reader when needed (e.g. when the battery is discharged), or the spare battery may be used to increase the current to recharge the battery of the reader in normal operation, when the reader is on the cradle. Additionally, in this case the spare battery may supply additional current to the battery of the reader to reduce the charging time. The final efficiency in this implementation may be lower, and the advantages of using a commercially available battery as secondary battery would be lost.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative embodiment applies equally regardless of the particular type of nontransitory signal bearing media used to actually carry out the distribution. Examples of nontransitory signal bearing media include, but are not limited to, the following: recordable type media such as floppy disks, hard disk drives, CD ROMs, digital tape, and computer memory.

The various embodiments described above can be combined to provide further embodiments. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A cradle for an electrical device, the electrical device includes an external surface having an electrical contact thereon, the electrical contact electrically coupled to at least one electrical component of the electrical device, the cradle comprising:
    a body that includes:
        a device receiver portion that receives or supports at least a portion of the electrical device, the device receiver portion includes a contact surface positioned adjacent the external surface of the electrical device when the at least a portion of the electrical device is received or supported by the device receiver portion, the contact surface includes a contact aperture therein;
    an electrical contact; and
    a contact actuator physically coupled to the electrical contact, the contact actuator moves the electrical contact between a retracted position wherein the electrical contact of the cradle is positioned below the contact surface of the device receiver portion, and a protruded position wherein the electrical contact at least partially extends above the contact surface through the contact aperture,
    wherein the contact surface of the device receiver portion includes a switch aperture, and the contact actuator comprises a beam and a switch, the beam pivotable about a pivot point, a first end of the beam physically coupled to the electrical contact and a second end of the beam physically coupled to the switch, the switch at least partially protrudes through the switch aperture of the contact surface of the device receiver portion when the at least a portion of the electrical device is separated from the device receiver portion and, when the at least a portion of the electrical device is received or supported by the device receiver portion, the switch contacts at least a portion of the electrical device and causes the beam to pivot until the electrical contact is in the protruded position.

2. The cradle of claim 1 wherein the contact actuator includes an elastic member that biases the electrical contact in the retracted position when the at least a portion of the electrical device is separated from the device receiver portion.

3. The cradle of claim 2 wherein the elastic member comprises a coil spring.

4. The cradle of claim 1 wherein the contact actuator includes at least one magnet that biases the electrical contact in at least one of the retracted position or the protruded position.

5. The cradle of claim 4 wherein the magnet causes at least one of an attraction force or a repulsion force with a component of the electrical device when the at least a portion of the electrical device is received or supported by the device receiver portion.

6. The cradle of claim 1, further comprising:
   a power source electrically coupleable to the electrical contact of the cradle.

7. The cradle of claim 1 wherein the body, the electrical contact and the contact actuator are selectively removable from a base portion of the cradle which houses one or more electrical components.

8. The cradle of claim 7 wherein the electrical contact is electrically coupleable to the one or more electrical components housed in the base portion of the cradle via at least one mechanical interlock.

9. The cradle of claim 1, wherein the cradle is a cradle for a machine-readable symbol reader.

\* \* \* \* \*